United States Patent
Lau et al.

(10) Patent No.: US 11,738,535 B2
(45) Date of Patent: Aug. 29, 2023

(54) METALLIZED BREATHABLE COMPOSITE TEXTILE

(71) Applicant: EEnotech, Inc., Sunnyvale, CA (US)

(72) Inventors: Cindy Yee Cin Lau, Palo Alto, CA (US); Pei Zhu, Santa Clara, CA (US)

(73) Assignee: EEnotech, Inc., Sunnyvale, CA (US)

( * ) Notice: Subject to any disclaimer, the term of this patent is extended or adjusted under 35 U.S.C. 154(b) by 77 days.

(21) Appl. No.: 16/941,418

(22) Filed: Jul. 28, 2020

(65) Prior Publication Data

US 2021/0031488 A1 Feb. 4, 2021

Related U.S. Application Data

(60) Provisional application No. 62/879,872, filed on Jul. 29, 2019.

(51) Int. Cl.
| | |
|---|---|
| *B32B 5/26* | (2006.01) |
| *B32B 5/02* | (2006.01) |
| *B32B 27/12* | (2006.01) |
| *B32B 7/12* | (2006.01) |
| *B32B 7/09* | (2019.01) |
| *B32B 7/05* | (2019.01) |
| *B32B 7/10* | (2006.01) |

(Continued)

(52) U.S. Cl.
CPC ............... *B32B 5/26* (2013.01); *B32B 5/022* (2013.01); *B32B 5/06* (2013.01); *B32B 7/05* (2019.01); *B32B 7/09* (2019.01); *B32B 7/10* (2013.01); *B32B 7/12* (2013.01); *B32B 27/12* (2013.01); *B32B 27/32* (2013.01); *B32B 2250/02* (2013.01); *B32B 2250/20* (2013.01); *B32B 2255/02* (2013.01); *B32B 2255/205* (2013.01); *B32B 2307/406* (2013.01); *B32B 2307/414* (2013.01); *B32B 2307/724* (2013.01); *B32B 2307/732* (2013.01); *B32B 2437/00* (2013.01)

(58) Field of Classification Search
CPC .. B32B 5/26; B32B 5/022; B32B 5/06; B32B 7/05; B32B 27/12; B32B 27/32; B32B 2250/02; B32B 2250/20; B32B 2255/02; B32B 2255/205; B32B 2307/724; B32B 2437/00; B32B 7/09; B32B 7/10; B32B 7/12; B32B 2307/406; B32B 2307/414; B32B 2307/732; B32B 2262/0261; B32B 2262/0276; B32B 2262/0292; B32B 5/024; B32B 5/026; B32B 7/14; B32B 2255/10; B32B 2262/0253; B32B 37/0084; B32B 2038/0092
USPC ................... 442/76, 131, 376–379
See application file for complete search history.

(56) References Cited

U.S. PATENT DOCUMENTS

| | | | |
|---|---|---|---|
| 4,999,222 A | * | 3/1991 | Jones ............... B29C 59/04 427/322 |
| 5,409,761 A | | 4/1995 | Langley |

(Continued)

OTHER PUBLICATIONS

International Search Report and Written Opinion for PCT/US2020/043890 dated Oct. 13, 2020, 7 pages.

*Primary Examiner* — Matthew D Matzek (57) ABSTRACT

A metallized breathable composite textile includes a lining layer and a metallized non-woven sheet disposed on the lining layer. The metallized non-woven sheet includes a base layer containing a polymer and a metal layer deposited on a first surface of the base layer. The lining layer is connected to the metallized non-woven sheet via point contacts.

20 Claims, 6 Drawing Sheets

(51) Int. Cl.
   *B32B 5/06*      (2006.01)
   *B32B 27/32*     (2006.01)

(56) References Cited

U.S. PATENT DOCUMENTS

| | | | |
|---|---|---|---|
| 2005/0014432 A1* | 1/2005 | Jain | B32B 27/286 |
| | | | 442/76 |
| 2006/0040091 A1 | 2/2006 | Bletsos et al. | |
| 2006/0099431 A1 | 5/2006 | Scholz | |
| 2008/0108263 A1* | 5/2008 | Conley | D04H 1/56 |
| | | | 442/76 |
| 2011/0214221 A1 | 9/2011 | Munda | |
| 2013/0212789 A1* | 8/2013 | Conolly | B32B 27/12 |
| | | | 2/458 |
| 2014/0227552 A1* | 8/2014 | Lau | B32B 5/26 |
| | | | 428/621 |
| 2018/0141741 A1 | 5/2018 | Conway | |
| 2019/0119847 A1 | 4/2019 | Brabbs et al. | |

\* cited by examiner

METALLIZED BREATHABLE COMPOSITE TEXTILE

CROSS REFERENCE TO RELATED APPLICATIONS

This application claims priority to and benefits of Provisional Patent Application No. 62/879,872 filed on Jul. 29, 2019. The content of the above-referenced application is incorporated herein by reference in its entirety.

TECHNICAL FIELD

This disclosure is generally related to textile for apparels, footwears, tents, and sleeping bags, and more specifically to metallized breathable composite textiles for apparels, footwears, tents, and sleeping bags, and methods for fabricating same.

BACKGROUND

Moisture vapor- and air-permeable metalized polyethylene plexifilamentary film-fibril sheets have been used as house wraps to increase insulation of buildings. However, those sheets are not suitable for garment due to poor hand feel, poor resistance to creases, and poor durability for washing.

SUMMARY

Described herein are breathable composite textiles for use in apparels and footwears that are comfortable to wear and durable to wash cycles.

In one embodiment, a breathable composite textile includes a lining layer and a metallized non-woven sheet disposed on the lining layer. The metallized non-woven sheet includes a base layer containing a polymer and a metal layer deposited on a first surface of the base layer. The lining layer is connected to the metallized non-woven sheet via point contacts. In some embodiments, the polymer includes polyethylene.

In some embodiments, the metal layer is sandwiched between the lining layer and the base layer. In some embodiments, the base layer is sandwiched between the lining layer and the metal layer.

In some embodiments, each of the lining layer, the base layer, and the metal layer has a moisture vapor transmission rate (MVTR) of at least 500 g/m$^2$/24 hr. In some embodiments, the lining layer has a thickness of at least 100 micrometers. The lining layer may include one of a woven fabric, a knit fabric, or a non-woven fabric. The lining layer may include a synthetic material or a natural material. In some embodiments, the synthetic material is selected from a group consisting of polyester, polyamide, polyurethane, polyolefin, and polylactic acid.

In some embodiments, the breathable composite textile does not reduce breathability (MVTR) of its components by more than 35%. In some embodiments, the point contacts are configured in a dot matrix. In some embodiments, the point contacts include at least one of an adhesive, melted base layer, or melted lining layer, or may be formed by sewing or quilting.

In some embodiments, the metal layer includes one or more of aluminum, titanium, gold, copper, zinc, and silver etc. In some embodiments, the metal layer has a thickness of about 10 nanometers to about 200 nanometers. In some embodiments, the metal layer is formed by vapor deposition of a metal onto the first surface of the base layer. In some embodiments, the metal layer has an emissivity of no more than 0.5 for infrared radiation at a wavelength of 9.5 micrometers.

In some embodiments, the base layer has a thickness less than about 500 micrometers or less than about 250 micrometers. In some embodiments, the base layer has an infrared transparency of at least about 40% at a wavelength of 9.5 micrometers.

In some embodiments, the first surface of the base layer has a specular gloss of at least 30 percent. The base layer has a second surface opposite to the first surface. The second surface has a roughness that is at least twice as that of the first surface.

In some embodiments, a breathable composite textile includes a lining layer and a metal layer disposed on the lining layer. The lining layer are connected to the metal layer via point contacts. The metal layer has a thickness of about 10 nanometers to about 200 nanometers.

In some embodiments, an apparatus includes a breathable composite textile. The breathable composite textile includes a lining layer and a metallized non-woven sheet disposed on the lining layer. The metallized non-woven sheet includes a base layer containing a polymer and a metal layer deposited on a first surface of the base layer. The lining layer is connected to the metallized non-woven sheet via point contacts to improve hand feel and durability of the metallized composite textile. In some embodiments, the apparatus includes one of an apparel, a footwears, a tent, or a sleeping bag.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the disclosure are utilized, and the accompanying drawings of which:

DETAILED DESCRIPTION OF EMBODIMENTS

In the following description, certain specific details are set forth in order to provide a thorough understanding of various embodiments of the disclosure. However, one skilled in the art will understand that the disclosure may be practiced without these details. Moreover, while various embodiments of the disclosure are disclosed herein, many adaptations and modifications may be made within the scope of the disclosure in accordance with the common general knowledge of those skilled in this art. Such modifications include the substitution of known equivalents for any aspect of the disclosure in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Various embodiments described herein are directed to breathable composite textiles for use in apparels and footwears. In one embodiment, a breathable composite textile includes a lining layer and a metallized non-woven sheet disposed on the lining layer. The metallized non-woven sheet includes a base layer containing a polymer and a metal layer deposited on a first surface of the base layer. The lining layer is connected to the metallized non-woven sheet via point contacts. In another embodiment, a breathable composite textile includes a lining layer and a metal layer disposed on the lining layer. The lining layer are connected to the metal layer via point contacts. The metal layer has a thickness of about 10 nanometers to about 200 nanometers.

Figure 1:
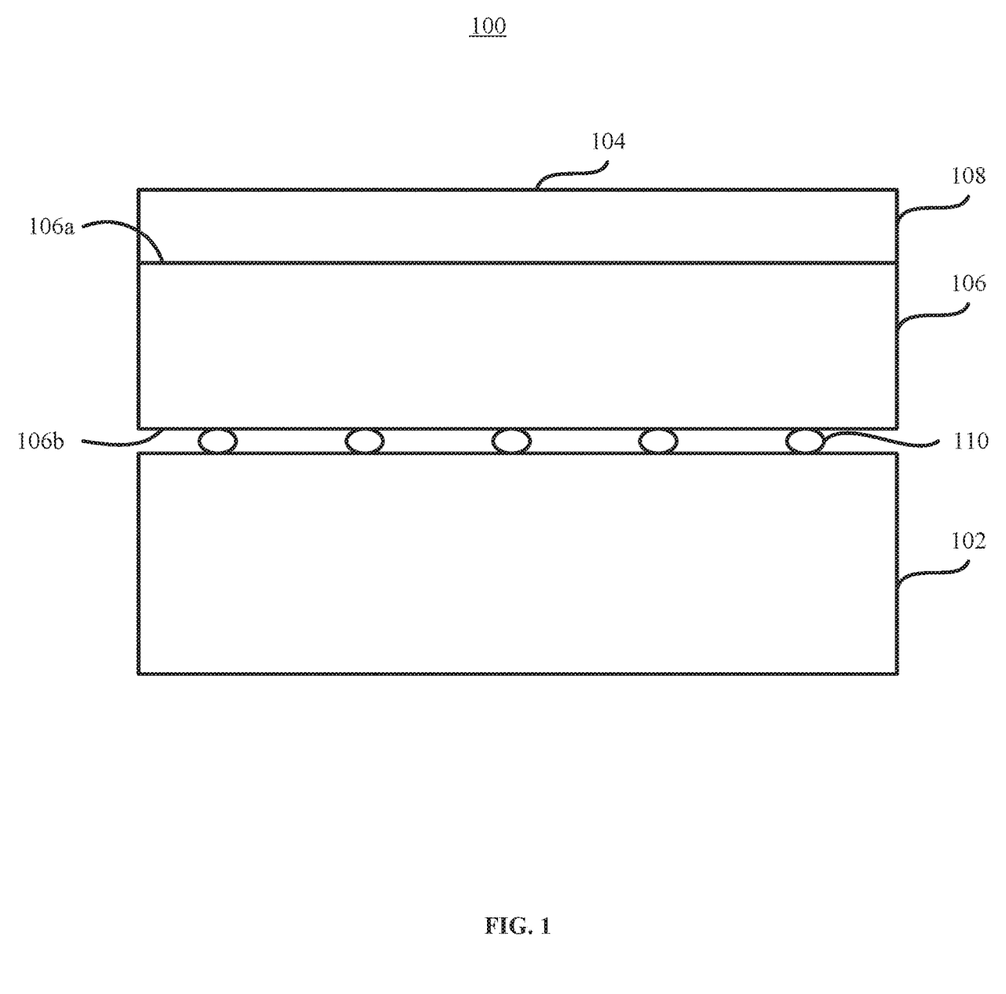
FIG. 1 is a schematic diagram depicting a breathable composite textile, according to one example embodiment.

Embodiments will now be explained with accompanying figures. Reference is first made to FIG. 1. FIG. 1 is a schematic diagram depicting a breathable composite textile 100 according to one example embodiment. The breathable composite textile 100 includes a lining layer 102 and a metallized non-woven sheet 104 disposed on the lining layer 102. The metallized non-woven sheet 104 includes a base layer 106 and a metal layer 108 deposited on a first surface 106a of the base layer 106. For example, the metal layer 108 may be formed by vapor deposition of a metal onto the first surface 106a of the base layer 106. The lining layer 102 and the metallized non-woven sheet 104 are connected to each other via point contacts 110. In the configuration illustrated in FIG. 1, the base layer 106 is sandwiched between the lining layer 102 and the metal layer 108.

Figure 2:
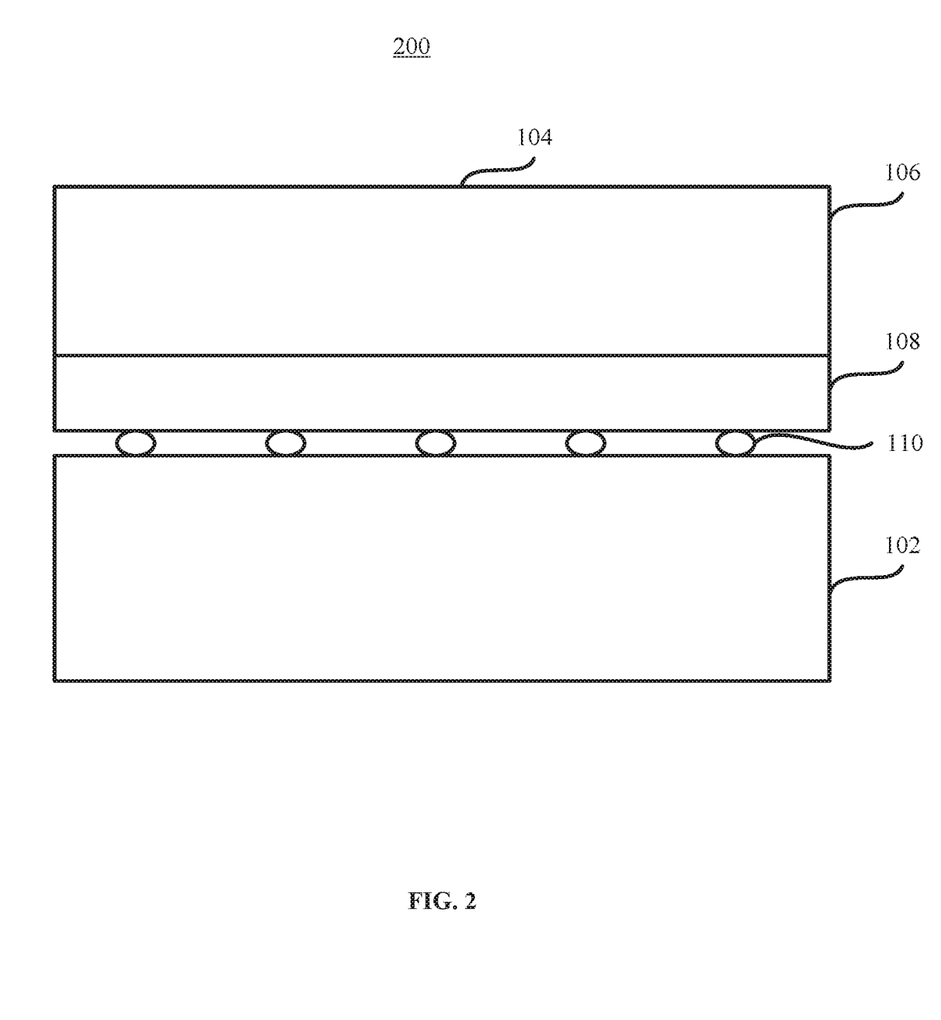
FIG. 2 is a schematic diagram depicting another breathable composite textile, according to one example embodiment.

FIG. 2 is a schematic diagram depicting another breathable composite textile 200 according to one example embodiment. The breathable composite textile 200 is similar to the breathable composite textile 100 with a modification where the metal layer 108 is sandwiched between the lining layer 102 and the base layer 106. The structure of the breathable composite textile 200 can better protect the metal layer 108 from scratches or other accidental damages during the subsequent processing and use.

Figure 3:
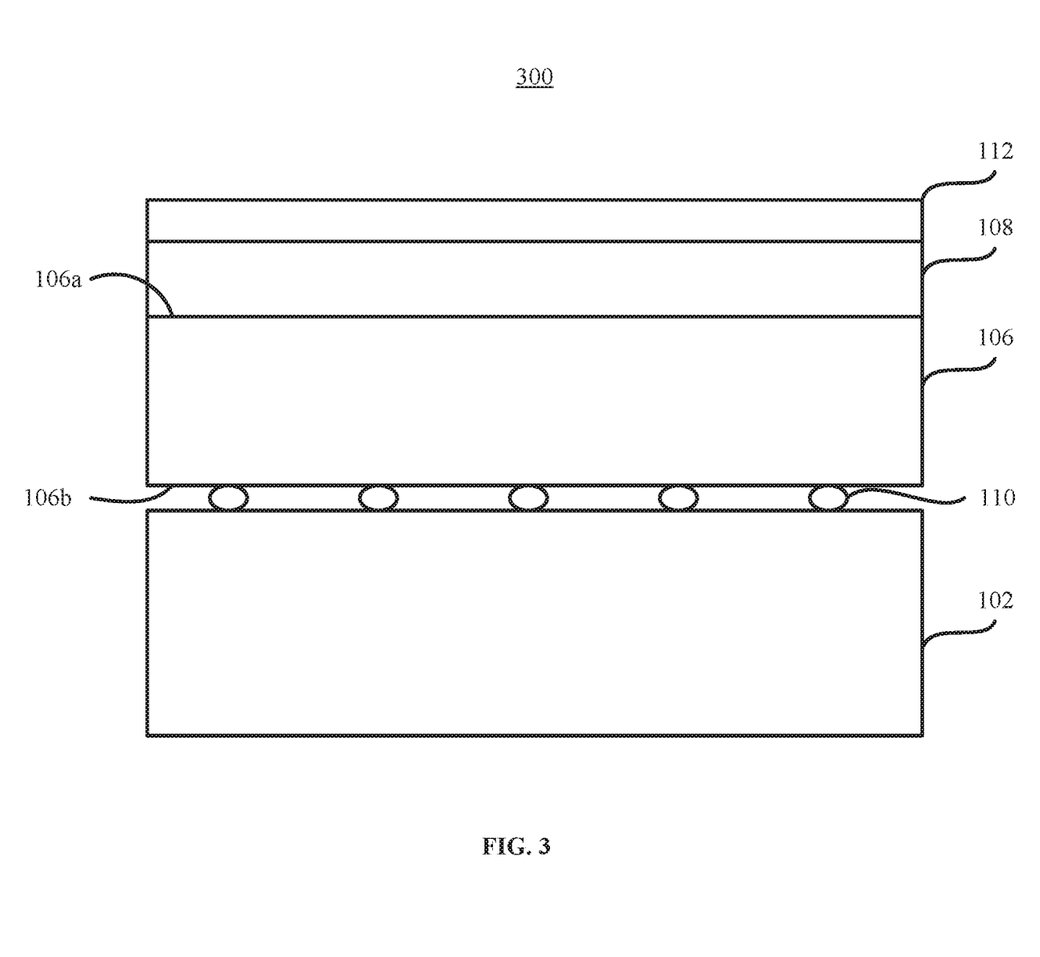
FIG. 3 is a schematic diagram depicting another breathable composite textile, according to one example embodiment.

FIG. 3 is a schematic diagram depicting another breathable composite textile 300 according to one example embodiment. The breathable composite textile 300 is similar to the breathable composite textile 100 with a modification where a coating layer 112 is disposed on the metal layer 108. The coating layer 112 may protect the metal layer 108 from being damaged. The coating layer 112 may be one or more organic materials and has a thickness of about 0.02 micrometers to about 2.5 micrometers.

The lining layer 102 is configured to add high breathability to the breathable composite textiles 100 and 200 to make apparels and footwears that are made therefrom more comfortable to wear. In some embodiments, the lining layer 102 has a moisture vapor transmission rate of at least 500 g/m$^2$/24 hr, at least 750 g/m$^2$/24 hr, at least 1000 g/m$^2$/24 hr, or at least 1500 g/m$^2$/24 hr. Including the lining layer 102 in the breathable composite textiles 100, 200, and 300 also provides soft touch feeling to human body. In some embodiments, the lining layer 102 has a thickness of at least 60 micrometers to endure the wear and tear during its useful life time. Depending on where the breathable composite textile 100, 200 or 300 is applied to, the thickness of the lining layer 102 may vary. For example, the thickness of the lining layer 102 may be from about 60 micrometers to about 2400 micrometers, from about 60 micrometers to about 1500 micrometers, from about 60 micrometers to about 1000 micrometers, from about 60 micrometers to about 750 micrometers, or from about 60 micrometers to about 500 micrometers.

In some embodiments, the lining layer 102 includes one of a woven fabric, a knit fabric, or a non-woven fabric. In some embodiments, the lining layer 102 includes a synthetic material or a natural material. For example, the synthetic material for the lining layer 102 is selected from a group consisting of polyester, polyamide, polyurethane, polyolefin, and polylactic acid. Further, the natural material for the lining layer 102 may include cotton, wool, silk, and other natural materials.

In some embodiments, the lining layer 102 has a tensile strength at least 45 N/2.54 cm under ASTM (American Society of Testing Materials) D5035 test conditions, a tear strength at least 9N under ASTM 2261 test conditions, and a Mullen burst at least 350 kPa under ASTM D774 test conditions.

The metallized non-woven sheet 104 is provided as a breathable radiant barrier for insulation purposes. For those purposes, the metallized non-woven sheet 104 is configured to have low emissivity and high breathability. In some cases, the metallized non-woven sheet 104 is optionally water proof. In some embodiments, the base layer 106 of the metallized non-woven sheet 104 includes a polymer. To be effective for its purposes, the base layer 106 has a thickness less than about 500 micrometers, or less than 250 micrometers, or less than about 200 micrometers, or less than about 150 micrometers, or less than about 100 micrometers, or about 20-100 micrometers, or about 40-90 micrometers. In some embodiments, the base layer 106 has an infrared transparency of at least about 40% at a wavelength of 9.5 micrometers. In some embodiments, the base layer 106 has an infrared transparency of about 40% to 60% at wavelength of 7-14 micrometers.

The base layer 106 has a first surface 106a in contact with the metal layer 108 and a second surface 106b facing the lining layer 102. The first surface 106a of the base layer 106 has a specular gloss of at least 28 percent (or at least about 15%, 20%, 25%, 30%, or 35%) to allow the base layer 106 to be more effective in reflecting thermal radiation. In some embodiments, the second surface 106b is configured to have a roughness greater than the first surface 106a. For example, the second surface 106b may have a roughness that is at least twice as that of the first surface 106a. A rough second surface 106b allows improved bonding between the metallized non-woven sheet 104 and the lining layer 102.

The first surface 106a of the base layer 106 is configured to be flat, which results in a more effective reflection layer after the base layer 106 is metallized. In some embodiments, the base layer 106 includes polyethylene, which has a lower melting point than many conventional textile materials so that it can achieve flatter surface through calendaring at a lower temperature. In some embodiments, the base layer 106 may include one or more other materials, such as polyester, polyamide, cotton, wool, etc. The structure of the base layer 106 is configured to maximize the thermal radiation to be reflected back to the body because minimal heat is consumed to warm up the base layer 106 due to absorption.

The metal layer 108 may be formed on the base layer 106 by vapor deposition or other plating techniques. In some embodiments, the metal layer 108 may include one or more of aluminum, titanium, gold, copper, zinc, and silver etc. In some embodiments, the metal layer 108 may have a thickness of about 10 nanometers to about 200 nanometers, about 10 nanometers to about 100 nanometers, or about 10 nanometers to about 50 nanometers. Other metals and thickness are contemplated so that the metal layer 108 has an emissivity of no more than 0.5 for infrared radiation at a wavelength of 9.5 micrometers.

The lining layer 102 and the metallized non-woven sheet 104 are connected with each other via a plurality of point contacts 110. In some embodiments, the metallized non-woven sheet 104 can be adhered to the lining fabric through adhesives, such as water-based adhesives, solvent-based adhesives, heat-activated adhesives, or pressure-activated adhesives. The adhesives are disposed on one or both of the lining layer 102 and the metallized non-woven sheet 104 to adhere them together. The adhesive is applied in a way that does not significantly reduce the breathability of the breathable composite textile 100 or 200. For example, this can be achieved through applying the adhesives as point contacts 110 in a dot matrix instead of a monolithic film.

In some embodiments, the lining layer 102 and the metallized non-woven sheet 104 may be combined through ultrasonic or laser welding. The metallized non-woven sheet 104 may also be connected to the underlying lining layer 102 by heating the contact points to above the melting point of the base layer 106 and/or the lining layer 102 under pressure. For example, a portion of the base layer 106 may be melted to form the point contacts 110 to connect to the lining layer 102. Or a portion of the lining layer 102 may be melted to form the point contacts 110 to connect to the base layer 106 (FIG. 1) or the metal layer 108 (FIG. 2). In some embodiments, both a portion of the lining layer 102 and a portion of the base layer 106 may be melted to form the point contacts 110 between the lining layer 102 and the metallized non-woven sheet 104. In some embodiments, the point contacts 110 may be formed by sewing or quilting.

The contact points 110 are interposed between the lining layer 102 and the metallized non-woven sheet 104 in a manner to minimize the impact on breathability of textile 100 or 200. For example, the point contacts 110 has an area covering less than 80% of the lining layer 102 (or the metallized non-woven sheet 104). For improved breathability, the point contacts 110 covers less than 50% or 40% or 30% of the lining layer 102 (or the metallized non-woven sheet 104). In some embodiments, the breathable composite textile 100, 200 or 300 does not reduce the breathability (MVTR) of its components by more than 35%. That is, the point contacts are arranged such that the breathable composite textile 100, 200 or 300 has a breathability (MVTR) at least 35% of its components including the lining layer 102 and the metallized non-woven sheet 104.

The contact points 110 interposed between the lining layer 102 and the metallized non-woven sheet 104 may be arranged in a dot matrix of any form. A density of the contact points 110 may be uniform across the entire breathable composite textile 100 or 200. In some embodiments, the density of the contact points 110 may vary from one to another region. For example, the density of the contact points 110 may be increased at areas where heavy wear and tear are expected.

The breathable composite textiles disclosed herein provide better resistance to wrinkling due to washing, resulting in washed samples with better thermal reflectivity. For example, a breathable composite textile consistent with this disclosure may have an emissivity of 0.2 at about 35° C. before any wash and dry cycle. The emissivity can be maintained at a relatively low level, e.g., 0.28, after 1-5 cycles of wash and dry. That is, the emissivity increases by 40% after 5 cycles of wash and dry. This indicates that breathable composite textiles may maintain their high reflectivity and good warming performance. In contrast, a metallized non-woven sheet without an underlying lining layer may have an emissivity of 0.14 at about 35° C. before any wash and dry cycle, which deteriorates to 0.28 after one cycle of wash and dry, to 0.34 after 3 cycles of wash and dry, and to 0.43 after 5 cycles of wash and dry. In some embodiments, the lining layer 102 provides further protection for the base layer 106 in the laundry (wash and dry) cycles to reduce excessive stretches imposed on the base layer 106. This results in reduced appearance changes to the breathable composite textiles.

Figure 4:
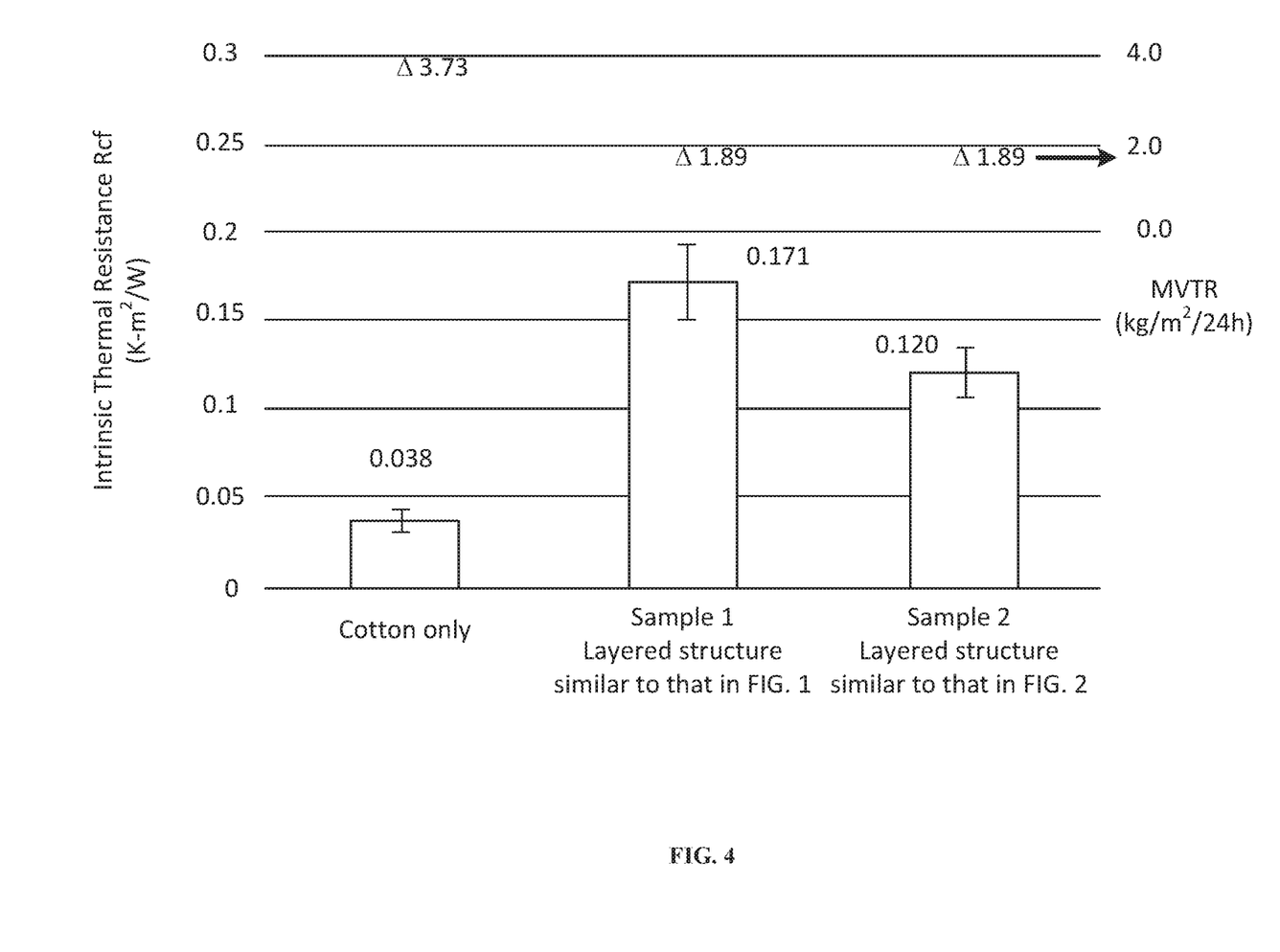
FIG. 4 depicts test results for three samples having layered structures similar to those in FIGS. 1-3, respective, according to one example embodiment.

In one example, each of breathable composite textiles including a cotton woven lining inner layer and an aluminized non-woven outer layer is tested for insulation/warming performance using a modified ASTM F1868 method. FIG. 4 shows test results for two samples (samples 1 and 2) having layered structures similar to those in FIGS. 1-2, respectively, according to one example embodiment. As shown in FIG. 4, each of the breathable composite textiles has increased thermal insulation over a woven cotton (159 g/m$^2$). Specifically, the thermal insulation of Sample 1 is 0.171 K-m$^2$/W, which is increased by about 4.5 times over 0.038 K-m$^2$/W for the cotton layer. The thermal insulation of Sample 2 is 0.120 K-m$^2$/W, which is increased by about 3.2 times over that for the cotton layer. The moisture vapor transfer rates (MVTR) of these sample are no less than 1.89 kg/m$^2$/24 hr.

Figure 5:
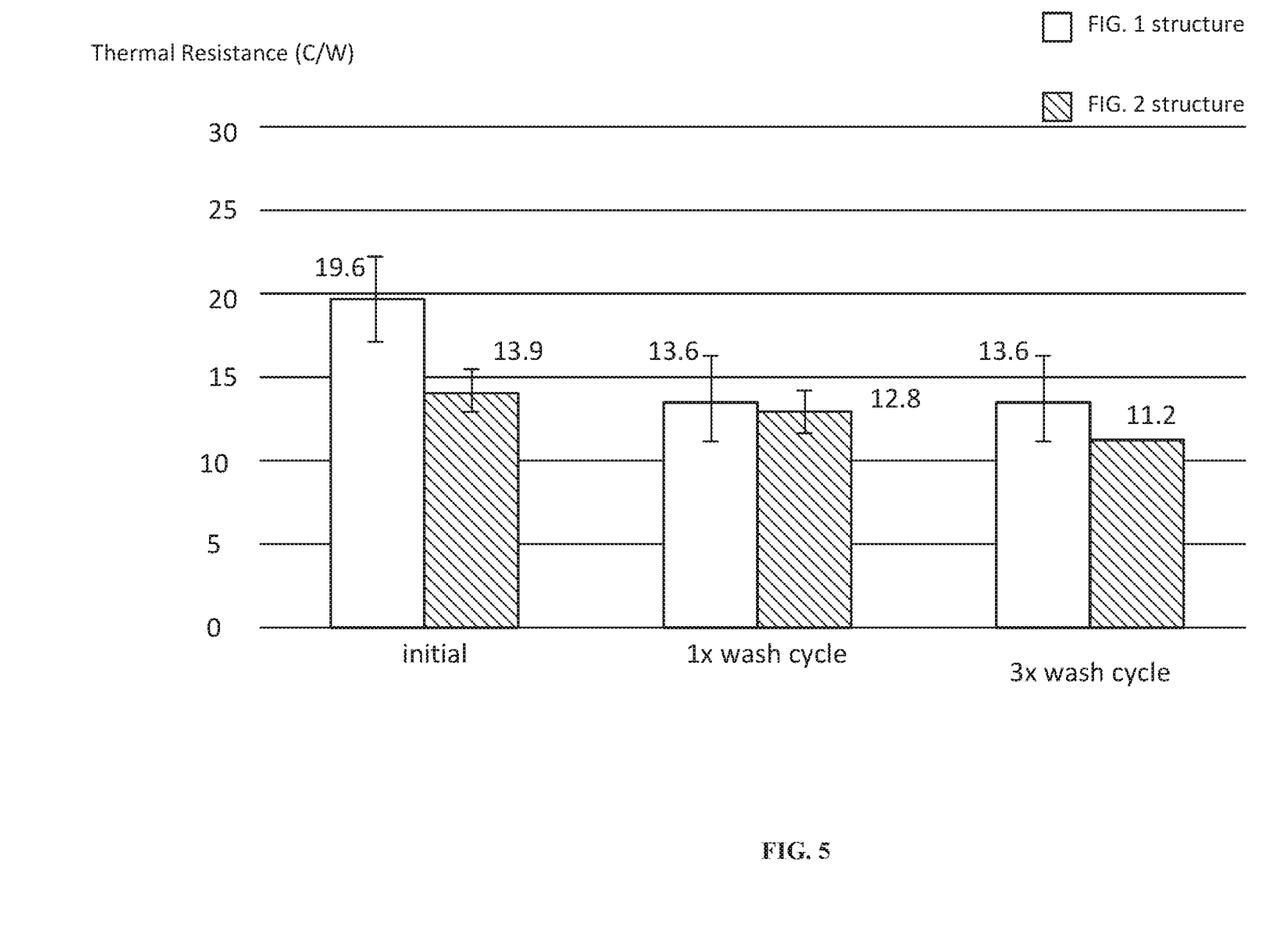
FIG. 5 shows durability of breathable composite textiles subject to wash and dry cycles, according to one example embodiment.

FIG. 5 shows durability of breathable composite textiles subject to wash and dry cycles, according to one example embodiment. As shown in FIG. 5, reasonable wash durability is achieved for the tested samples. The warming performance drops no more than 20-31% after three cycles of machine wash and tumble dry.

Figure 6A:
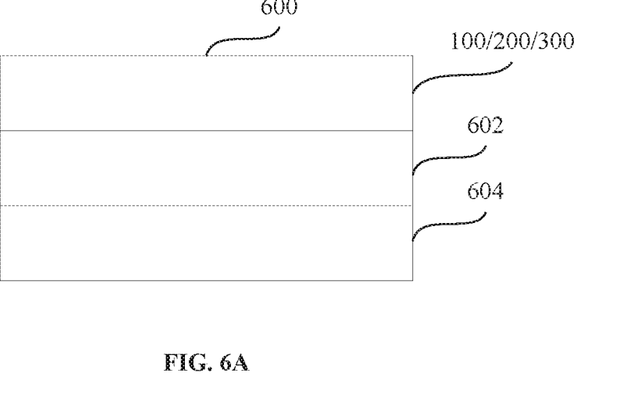
FIGS. 6A-6C are schematic diagrams depicting laminates according to example embodiments.
Figure 6B:
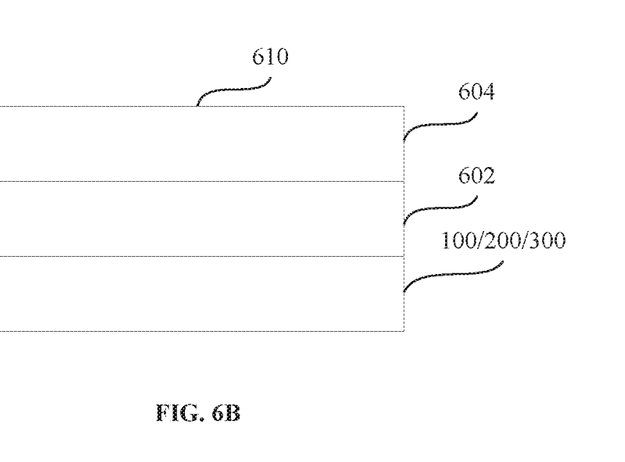
Figure 6C:
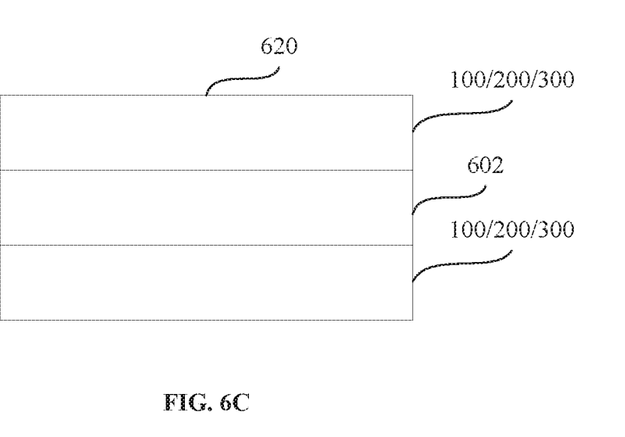

In some embodiments, the breathable composite textile 100/200/300 may be used with other materials to make apparels, footwears, tents, sleeping bags, etc. Example configurations are illustrated in FIGS. 6A-6C. FIG. 6A is a schematic diagram depicting a laminate 600 according to one example embodiment. The laminate 600 includes an outer layer made of the breathable composite textile 100/200/300, an intermediate fibrous layer 602, and a single-layered fibric 604. In some embodiments, the intermediate fibrous layer 602 may include a fibrous insulation material, such as synthetic insulation, down, etc.

FIG. 6B is a schematic diagram depicting a laminate 610 according to one example embodiment. The laminate 610 includes an outer layer made of a single-layered fibric 604, an intermediate fibrous layer 602, and an inner layer made of the breathable composite textile 100/200/300.

FIG. 6C is a schematic diagram depicting a laminate 620 according to one example embodiment. The laminate 620 includes an outer layer made of breathable composite textile 100/200/300, an intermediate fibrous layer 602, and an inner layer made of the breathable composite textile 100/200/300. It is to be understood that laminates 600, 610 and 620 are for illustration purpose only. Other structures using the breathable composite textile 100/200/300 are contemplated.

In one aspect, a breathable composite textile disclosed herein has high breathability, which makes it more comfortable to be worn than garment made from non-porous reflective foil.

In another aspect, a breathable composite textile disclosed herein includes a more effective reflection layer using a metallized non-woven sheet. The metallized non-woven sheet includes a base layer made of polyethylene, which has a lower melting point than many conventional textile material so that it can achieve flatter surface through calendaring at a lower temperature, e.g., less than 200° C. or about 135° C.

In yet another aspect, a breathable composite textile disclosed herein includes a base layer of polyethylene having a thin thickness of about 200 micrometers or less, making it fairly transparent (about 40-60%) to infra-red radiation from human body (wavelength about 7-14 micrometers). The breathable composite textile thus maximizes thermal radiation to be reflected back to the body because minimal heat is consumed to warm up the layers due to absorption.

In another aspect, a breathable composite textile disclosed herein provide better structural integrity and anti-oxidation ability than that of other meltspun non-woven materials, making the breathable composite textile less susceptible to disintegration after washing.

In another aspect, a breathable composite textile disclosed herein includes point contacts for adhering a lining layer to a metallized non-woven sheet, resulting in high breathability that is desirable for applications in apparels, footwears, tents, and sleeping bags, or other applications that need textile materials.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the disclosure be defined by the following claims and their equivalence.

What is claimed is:

1. A metallized breathable composite textile for apparel comprising:
   a lining layer; and
   a metallized non-woven sheet disposed on the lining layer, the metallized non-woven sheet including a base layer containing a polymer comprising polyethylene and a metal layer deposited on a first surface of the base layer, wherein the first surface of the base layer has a specular gloss of at least 35 percent, wherein a second surface of the base layer opposite to the first surface has a surface roughness at least twice as a surface roughness of the first surface,
   wherein the lining layer is connected to the second surface of the base layer via point contacts, wherein the point contacts covers less than 30% of the second surface, and
   wherein each of the lining layer, the base layer, and the metal layer has a moisture vapor transmission rate of at least 500 g/m$^2$/24 hr, wherein the metallized breathable composite textile for apparel has a breathability (MVTR) at least 35% of the lining layer and the metallized non-woven sheet.

2. The metallized breathable composite textile for apparel according to claim 1, further comprising a coating layer disposed on the metal layer.

3. The metallized breathable composite textile for apparel according to claim 1, wherein the metallized breathable composite textile for apparel has an emissivity of 0.2 at about 35° C. before any wash and dry cycle, wherein the emissivity becomes 0.28 after 5 cycles of wash and dry.

4. The metallized breathable composite textile for apparel according to claim 1, wherein the lining layer has a thickness of at least 60 micrometers.

5. The metallized breathable composite textile for apparel according to claim 1, wherein the lining layer includes one of a woven fabric, a knit fabric, or a non-woven fabric.

6. The metallized breathable composite textile for apparel according to claim 5, wherein the lining layer includes a synthetic material or a natural material.

7. The metallized breathable composite textile for apparel according to claim 6, wherein the synthetic material is selected from a group consisting of polyester, polyamide, polyurethane, polyolefin, and polylactic acid.

8. The metallized breathable composite textile for apparel according to claim 1, wherein the point contacts include an adhesive.

9. The metallized breathable composite textile for apparel according to claim 1, wherein the point contacts include melted base layer.

10. The metallized breathable composite textile for apparel according to claim 1, wherein the point contacts include melted lining layer.

11. The metallized breathable composite textile for apparel according to claim 1, wherein the point contacts are formed by sewing or quilting.

12. The metallized breathable composite textile for apparel according to claim 1, wherein the metal layer comprises one or more of aluminum, titanium, gold, copper, zinc, and silver.

13. The metallized breathable composite textile for apparel according to claim 1, wherein the metal layer has a thickness of about 10 nanometers to about 200 nanometers.

14. The metallized breathable composite textile for apparel according to claim 1, wherein the metal layer is formed by vapor deposition of a metal to the first surface of the base layer.

15. The metallized breathable composite textile for apparel according to claim 1, wherein the metal layer has an emissivity of no more than 0.5 for infrared radiation at a wavelength of 9.5 micrometers.

16. The metallized breathable composite textile for apparel according to claim 1, wherein the base layer has a thickness less than about 500 micrometers.

17. The metallized breathable composite textile for apparel according to claim 1, wherein the base layer has an infrared transparency of at least about 40% at a wavelength of 9.5 micrometers.

18. An apparatus comprising a metallized composite textile, the metallized composite textile including:
a lining layer; and
a metallized non-woven sheet disposed on the lining layer, the metallized non-woven sheet including a base layer containing a polymer comprising polyethylene and a metal layer deposited on a first surface of the base layer, wherein the first surface of the base layer has a specular gloss of at least 35 percent, wherein a second surface of the base layer opposite to the first surface has a surface roughness at least twice as a surface roughness of the first surface,
wherein the lining layer is connected to the second surface of the base layer via point contacts to improve hand feel and durability of the metallized composite textile, wherein the point contacts covers less than 30% of the second surface, and
wherein each of the lining layer, the base layer, and the metal layer has a moisture vapor transmission rate of at least 500 g/m$^2$/24 hr, wherein the metallized breathable composite textile has a breathability (MVTR) at least 35% of the lining layer and the metallized non-woven sheet.

19. The apparatus according to claim 18, wherein the apparatus is one of an apparel, a footwears, a tent, or a sleeping bag.

20. The apparatus according to claim 18, wherein the metallized composite textile further comprises a coating layer disposed on the metal layer.

* * * * *